United States Patent
Pi et al.

(10) Patent No.: US 12,526,045 B2
(45) Date of Patent: Jan. 13, 2026

(54) DOWNLINK DATA TRANSMISSION METHOD AND APPARATUS, AND STORAGE MEDIUM AND ELECTRONIC APPARATUS

(71) Applicant: ZTE CORPORATION, Shenzhen (CN)

(72) Inventors: Qiang Pi, Shenzhen (CN); Yangfeng Wang, Shenzhen (CN); Wei Lu, Shenzhen (CN); Jianan Wang, Shenzhen (CN); Duanrui Fu, Shenzhen (CN); Xiaoliang Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 404 days.

(21) Appl. No.: 18/251,758

(22) PCT Filed: Jul. 19, 2021

(86) PCT No.: PCT/CN2021/107111
§ 371 (c)(1),
(2) Date: May 4, 2023

(87) PCT Pub. No.: WO2022/095508
PCT Pub. Date: May 12, 2022

(65) Prior Publication Data
US 2024/0007184 A1     Jan. 4, 2024

(30) Foreign Application Priority Data
Nov. 4, 2020 (CN) .......................... 202011217924.9

(51) Int. Cl.
*H04B 10/079*     (2013.01)
*H04W 72/23*     (2023.01)

(52) U.S. Cl.
CPC ..... *H04B 10/0795* (2013.01); *H04B 10/0791* (2013.01); *H04W 72/23* (2023.01)

(58) Field of Classification Search
None
See application file for complete search history.

(56) References Cited

U.S. PATENT DOCUMENTS

| 2006/0168612 A1 | 7/2006 | Chapman et al. |
| 2008/0075121 A1 | 3/2008 | Fourcand |

(Continued)

FOREIGN PATENT DOCUMENTS

| CN | 101860401 A | 10/2010 |
| CN | 102656820 A | 9/2012 |

(Continued)

OTHER PUBLICATIONS

International Searching Authority. International Search Report and Written Opinion for PCT Application No. PCT/CN2021/107111 and English translation, mailed Oct. 15, 2021, pp. 1-10.

(Continued)

*Primary Examiner* — David W Lambert
(74) *Attorney, Agent, or Firm* — Vivacqua Crane, PLLC

(57) ABSTRACT

A downlink data transmission method and apparatus, a storage medium, and an electronic device are disclosed. The method may include: determining a transmission delay, where the transmission delay includes a sum of an optical fiber transmission delay and a downlink processing delay from a Media Access Control (MAC) exit to an air interface (S102); determining a frame starting time of the MAC exit according to the transmission delay (S104); and transmitting downlink data according to the frame starting time (S106).

12 Claims, 3 Drawing Sheets

(56) References Cited

U.S. PATENT DOCUMENTS

| | | | |
|---|---|---|---|
| 2012/0275357 A1 | 11/2012 | Tirkkonen et al. | |
| 2013/0170372 A1 | 7/2013 | Zhang et al. | |
| 2013/0266323 A1 | 10/2013 | Tan | |
| 2013/0343501 A1 | 12/2013 | Arambepola et al. | |
| 2014/0226736 A1* | 8/2014 | Niu .................... | H04W 88/085 |
| | | | 375/260 |
| 2017/0273100 A1 | 9/2017 | Huang et al. | |
| 2018/0076914 A1 | 3/2018 | Zhou et al. | |
| 2018/0212748 A1 | 7/2018 | Liu et al. | |

FOREIGN PATENT DOCUMENTS

| | | | | |
|---|---|---|---|---|
| CN | 102687526 | A | 9/2012 | |
| CN | 102984107 | A | 3/2013 | |
| CN | 104244397 | A | 12/2014 | |
| CN | 105610535 | A | 5/2016 | |
| CN | 110050417 | A | 7/2019 | |
| CN | 116057865 | A | 5/2023 | |
| WO | 2009003335 | A1 | 1/2009 | |
| WO | WO-2017012384 | A1 * | 1/2017 | ............ H04W 28/16 |

OTHER PUBLICATIONS

The State Intellectual Property Office of People's Republic of China. First Office Action for CN Application No. 202011217924.9 and English translation, mailed Dec. 19, 2024, pp. 1-16.
The State Intellectual Property Office of People's Republic of China. First Search Report for CN Application No. 202011217924.9 and English translation, mailed Dec. 12, 2024, pp. 1-5.
European Patent Office. Extended European Search Report for EP Application No. 201888208.2, mailed Apr. 2, 2024, pp. 1-9.

* cited by examiner

DOWNLINK DATA TRANSMISSION METHOD AND APPARATUS, AND STORAGE MEDIUM AND ELECTRONIC APPARATUS

CROSS-REFERENCE TO RELATED APPLICATION

This application is a national stage filing under 35 U.S.C. § 371 of international application number PCT/CN2021/107111 filed on Jul. 19, 2021, which claims priority to Chinese patent application No. 202011217924.9 filed on Nov. 4, 2020. The contents of these applications are incorporated herein by reference in their entirety.

TECHNICAL FIELD

Embodiments of the present disclosure relate to the field of communication, and in particular to a downlink data transmission method and apparatus, a storage medium, and an electronic device.

BACKGROUND

For the deployment of wireless access network devices in a project, generally a Base Band Unit (BBU) and an Active Antenna Unit (AAU)/Remote Radio Unit (RRU) are deployed separately. The BBU is placed in a high-density communication room environment, and is connected to the AAU placed on a tower or the RRU placed below a tower through a remote optical fiber. In order to avoid interference of uplink and downlink channels between cells, clocks of data transmitting and receiving need to be aligned at the air interfaces of wireless cellular networks, where the clock of data transmitting and receiving is the time at which a signal is sent from or received by the AAU/RRU. In the downlink direction, for networking with different fiber lengths, in order to realize the alignment of all data sent by the AAU/RRU at the air interfaces, compensation needs to be made according to a maximum optical fiber length, i.e., data is sent from the BBU according to a maximum possible transmission delay.

In a commonly used method for downlink optical fiber length compensation, an optical fiber delay compensation buffer is inserted into the link after downlink bit-level processing, such that the sum of the data transmission delay on the optical fiber and the retention delay in the buffer remains unchanged. However, this method has two problems: (1) In a long-distance and multi-antenna scenario, a very large buffer is required for compensation. Regardless of whether the compensation buffer is placed in the BBU, in the AAU/RRU, or partly in the BBU and partly in the AAU/RRU, buffer overheads of the BBU or the AAU/RRU are affected, resulting in an increase in hardware costs and power consumption. (2) In a long-distance scenario, the processing time of each baseband component, especially the PHY-layer bit-level processing time, is reduced, directly affecting the throughput of bit-level Turbo/Ldpc/Polar coding and reducing the downlink download throughput of the terminal device.

Therefore, there are problems of large buffer and low downlink download throughput during delay compensation in some cases.

No effective solution has been proposed to solve the above problems in some cases.

SUMMARY

Embodiments of the present disclosure provide a downlink data transmission method and apparatus, a storage medium, and an electronic device, to solve, at least to a certain extent, one of the related technical problems including the problems of large buffer and low downlink download throughput during delay compensation in some cases.

According to an embodiment of the present disclosure, a downlink data transmission method is provided. The method may include: determining a transmission delay, where the transmission delay includes a sum of an optical fiber transmission delay and a downlink processing delay from a Media Access Control (MAC) exit to an air interface; determining a frame starting time of the MAC exit according to the transmission delay; and transmitting downlink data according to the frame starting time.

According to another embodiment of the present disclosure, a downlink data transmission apparatus is provided. The apparatus may include: a first determination module, configured for determining a transmission delay, where the transmission delay includes a sum of an optical fiber transmission delay and a downlink processing delay from a MAC exit to an air interface; a second determination module, configured for determining a frame starting time of the MAC exit according to the transmission delay; and a transmission module, configured for transmitting downlink data according to the frame starting time.

According to still another embodiment of the present disclosure, a computer-readable storage medium is provided. The computer-readable storage medium stores a computer program which, when executed by a processor, causes the processor to perform the method of any one of the above method embodiments.

According to still another embodiment of the present disclosure, an electronic device is further provided. The device may include a memory and a processor, where the memory is configured for storing a computer program which, when executed by the processor, causes the processor to perform the method of any one of the above method embodiments.

DETAILED DESCRIPTION

Embodiments of the present disclosure will be described in detail below in conjunction with the drawings and the embodiments.

It should be noted that the terms such as "first", "second" and the like in the description, the claims, and the accompanying drawings are used to distinguish similar objects, and are not necessarily used to describe a specific sequence or a precedence order.

Figure 1:
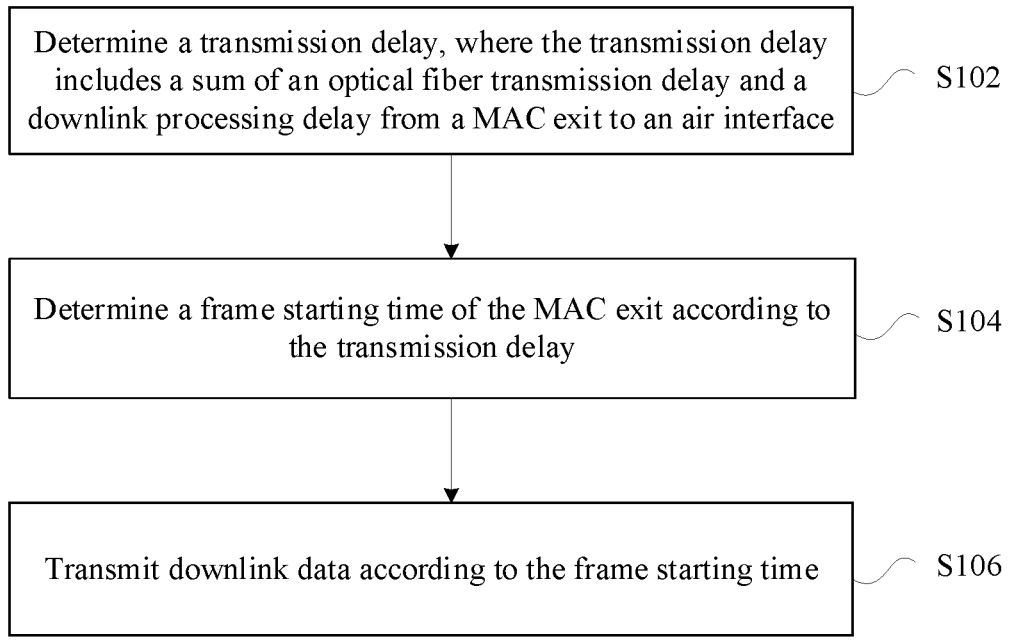
FIG. 1 is a flowchart of a downlink data transmission method according to an embodiment of the present disclosure.

An embodiment of the present disclosure provides a downlink data transmission method. FIG. 1 is a flowchart of a downlink data transmission method according to an embodiment of the present disclosure. As shown in FIG. 1, the method includes the following steps.

At S102, a transmission delay is determined, where the transmission delay includes a sum of an optical fiber transmission delay and a downlink processing delay from a Media Access Control (MAC) exit to an air interface.

At S104, a frame starting time of the MAC exit is determined according to the transmission delay.

At S106, downlink data is transmitted according to the frame starting time.

In the above embodiment, the optical fiber transmission delay is measured, and the sum of the measured optical fiber transmission delay and the known downlink processing delay from the MAC exit to the air interface is calculated as a downlink frame starting time of the MAC exit. That is to say, the downlink frame starting time of the MAC exit can be adjusted according to the optical fiber length, to achieve downlink optical fiber delay compensation. The frame starting time is a starting point at which the MAC exit begins to transmit data, and the downlink data transmission may be started from the frame starting time. For the measurement of the optical fiber transmission delay, the optical fiber length may be measured and then converted into the optical fiber transmission delay, which is reported to MAC; or the optical fiber length may be measured and divided by n km, the quotient is rounded up, and then a result is converted into the optical fiber transmission delay, which is reported to MAC. The MAC adjusts the downlink frame starting time of the MAC exit according to the measured optical fiber delay and a known downlink processing delay from the MAC exit to an air interface.

For example, the above steps may be executed by the MAC, a data processing system including a BUU and an AAU/RRU, or other terminal devices having a similar processing function.

According to the present disclosure, after the sum of the optical fiber transmission delay and the downlink processing delay from the MAC exit to the air interface is determined, the frame starting time of the MAC exit is determined according to the transmission delay, and the downlink data is transmitted according to the frame starting time. In this way, the optical fiber transmission delay compensation can be achieved by adjusting the frame starting time of the MAC exit. Therefore, the problems of large buffer and low downlink download throughput in some cases can be solved, thereby achieving the effect of optical fiber transmission delay compensation.

In an embodiment, determining a transmission delay includes one of: determining the transmission delay configured by a predetermined device; or determining the optical fiber transmission delay and the downlink processing delay transmitted by a predetermined device, and determining the sum of the optical fiber transmission delay and the downlink processing delay as the transmission delay. In this embodiment, the predetermined device may determine the transmission delay and then transmit the transmission delay to the MAC. Alternatively, the predetermined device may determine the optical fiber transmission delay and the downlink processing delay and then transmit the two delays to the MAC, and the MAC determines the transmission delay by summing up the two delays. The predetermined device may be a software platform or other modules, i.e., the predetermined device is a device that can determine the optical fiber transmission delay and the downlink processing delay.

In an embodiment, the optical fiber transmission delay includes one of: a first optical fiber transmission delay which is a ratio of a length of an optical fiber to a data transmission speed in the optical fiber; or a second optical fiber transmission delay which is an optical fiber transmission delay determined based on a delay range within which a ratio of a length of an optical fiber to a data transmission speed in the optical fiber falls. In this embodiment, the optical fiber transmission delay may be determined by the ratio of the length of the optical fiber to the data transmission speed in the optical fiber; or may be determined by the delay range within which the ratio of the length of the optical fiber to the data transmission speed in the optical fiber falls. For example, if the ratio of the length of the optical fiber to the data transmission speed in the optical fiber is 3.5 µs, the first optical fiber transmission delay is 3.5 µs. 3.5 µs falls within a range of 0 to 5 µs, so the second optical fiber transmission delay may be determined as 5 µs. Alternatively, the second optical fiber transmission delay may also be a delay obtained by rounding up the ratio of the length of the optical fiber to the data transmission speed in the optical fiber. For example, when the ratio of the length of the optical fiber to the data transmission speed in the optical fiber is 3.5 µs, the second optical fiber transmission delay may be a transmission delay obtained by rounding up 3.5 µs, i.e., the second optical fiber transmission delay may be 4 µs.

Figure 2:
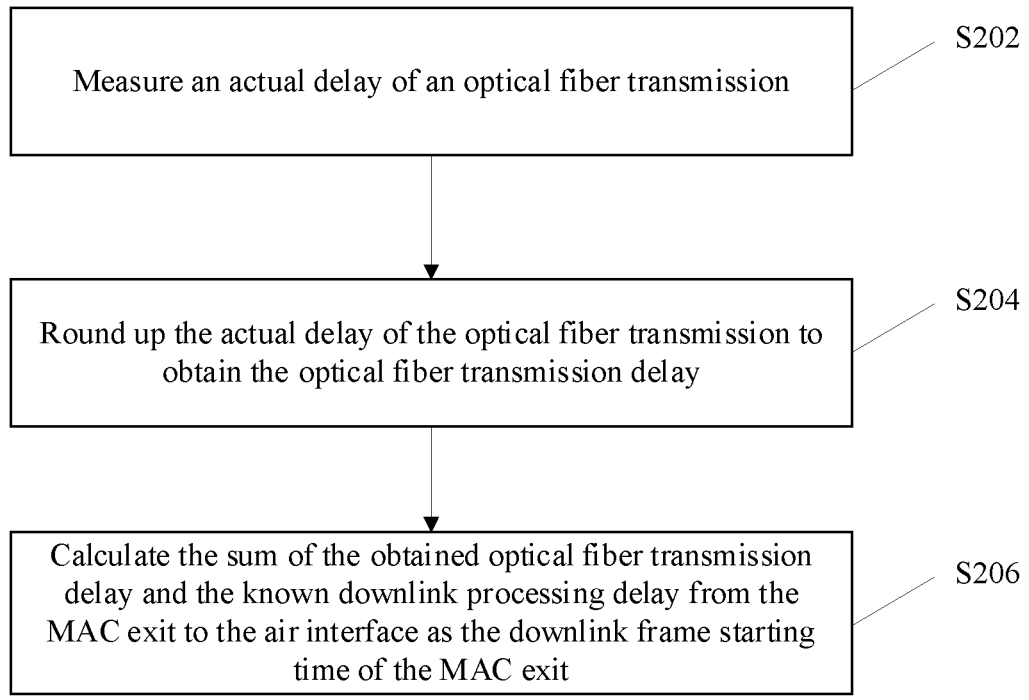
FIG. 2 is a flowchart showing a delay compensation principle according to an embodiment of the present disclosure.

In the above embodiment, when the optical fiber transmission delay includes the second optical fiber transmission delay, reference is made to FIG. 2 for a flowchart showing a delay compensation principle. As shown in FIG. 2, the process includes the following steps.

At S202, an actual delay of an optical fiber transmission is measured.

At S204, the actual delay of the optical fiber transmission is rounded up to obtain the optical fiber transmission delay.

At S206, the sum of the obtained optical fiber transmission delay and the known downlink processing delay from the MAC exit to the air interface is calculated as the downlink frame starting time of the MAC exit.

In an embodiment, in the case that the optical fiber transmission delay includes the second optical fiber transmission delay, the method further includes one of:

buffering the downlink data being transmitted by utilizing a first buffer disposed at an exit of a Base Band Unit (BBU), and when a buffer time reaches a first time, continuing to transmit the downlink data, where the first time is a difference between a first value and a second value, the first value is a value obtained by rounding up the ratio of the length of the optical fiber to the data transmission speed in the optical fiber, and the second value is the ratio of the length of the optical fiber to the data transmission speed in the optical fiber;

buffering the downlink data being transmitted by utilizing a second buffer disposed at an entry of an Active Antenna Unit (AAU)/Remote Radio Unit (RRU), and when a buffer time reaches a second time, continuing to transmit the downlink data, where the second time is a difference between a first value and a second value, the first value is a value obtained by rounding up the ratio of the length of the optical fiber to the data transmission speed in the optical fiber, and the second value is the ratio of the length of the optical fiber to the data transmission speed in the optical fiber;

buffering the downlink data being transmitted by utilizing a first buffer disposed at an exit of a BBU, and in response to a buffer time reaching a first time, continuing to transmit the downlink data; and buffering the downlink data being transmitted by utilizing a second buffer disposed at an entry of an AAU/RRU, and when a buffer time reaches a second time, continuing to transmit the downlink data, where a sum of the first time and the second time is a difference between a first value and a second value, the first value is a value obtained by rounding up the ratio of the length of the optical fiber to the data transmission speed in the optical fiber, and the second value is the ratio of the length of the optical fiber to the data transmission speed in the optical fiber.

In this embodiment, a small buffer, i.e., the first buffer, may be added at the exit of the BBU, to buffer data corresponding to a delay of n km; a small buffer, i.e., the second buffer, may be added at the exit of the AAU/RRU, to buffer the data corresponding to a delay of n km; or, a small buffer may be added at each of the exit of the BBU and the exit of the AAU/RRU, such that a sum of a delay of data buffered in the first buffer and a delay of data buffered in the second buffer equals to a delay of n km. It should be noted that in this embodiment, the first value may be determined by rounding up the ratio of the length of the optical fiber to the data transmission speed in the optical fiber; or a first optical fiber may be determined by rounding up the length of the optical fiber, and then the first value is be determined according to a ratio of the first optical fiber length to the data transmission speed in the optical fiber. For example, if the length of the optical fiber is 4.5 km, a value obtained by dividing the length of the optical fiber by the data transmission speed in the optical fiber is rounded up to obtain the first value; or the length of the optical fiber is rounded up to 5 km, and 5 km is divided by the data transmission speed in the optical fiber to obtain the first value.

In an embodiment, an interface between the BBU and the AAU/RRU supports at least one of the following protocols: eCPRI protocol, ORAN protocol, ROE protocol, or CPRI protocol.

In an embodiment, if the delay range of the ratio of the length of the optical fiber to the data transmission speed in the optical fiber is between a first delay value and a second delay value, the second optical fiber transmission delay is the second delay value, where the first delay value is smaller than the second delay value, and the first delay value and the second delay value are predetermined delay values. In this embodiment, when the delay range of the ratio of the length of the optical fiber to the data transmission speed in the optical fiber is between the first delay value and the second delay value, the second optical fiber transmission delay may be set as the second delay value. The first delay value and the second delay value may be manually set values, and different first delay values and second delay values may be set according to different cells.

How to transmit downlink data is described below in conjunction with some implementations.

Figure 3:
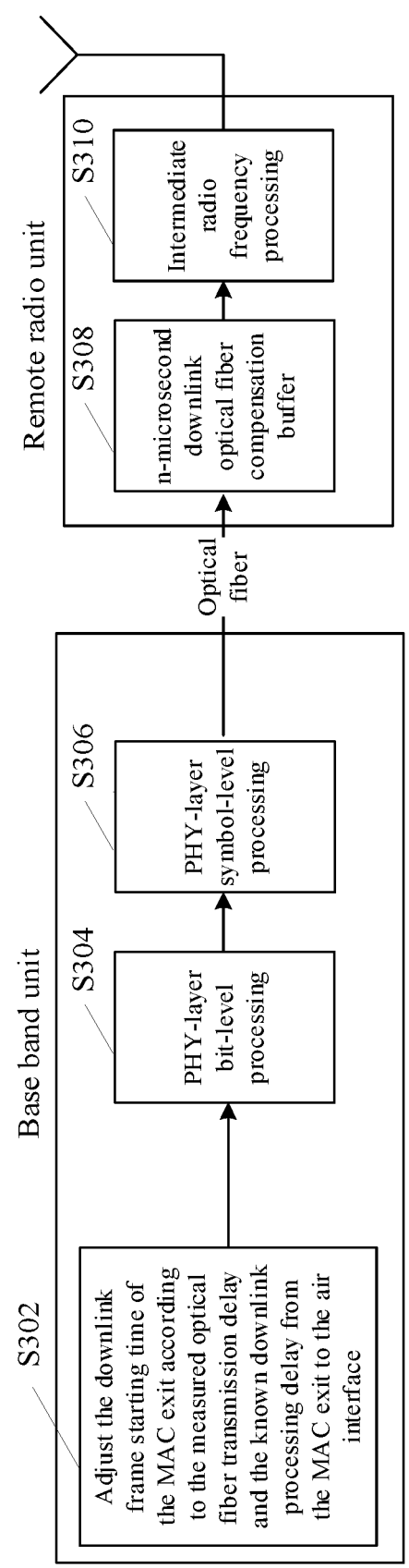
FIG. 3 is a schematic diagram of downlink optical fiber delay compensation according to an embodiment of the present disclosure.

FIG. 3 is a schematic diagram of implementing downlink optical fiber delay compensation by adjusting the downlink frame starting time of the MAC exit according to the length of the optical fiber in an optical port slicing scenario according to an embodiment of the present disclosure. As shown in FIG. 3, the delay compensation process includes the following steps.

At S302, the downlink frame starting time of the MAC exit is adjusted according to the measured optical fiber transmission delay and the known downlink processing delay from the MAC exit to the air interface.

At S304, PHY-layer bit-level processing is performed on a signal.

At S306, PHY-layer symbol-level processing is performed on the signal obtained after the bit-level processing.

At S308, the signal obtained after the symbol-level processing is buffered in an n-microsecond downlink optical fiber compensation buffer.

At S310, intermediate radio frequency processing is performed on the signal obtained after the symbol-level processing, and the processed signal is transmitted through an antenna.

It should be noted that after the PHY-layer symbol-level processing, the signal obtained after the symbol-level processing may be transmitted through an interface between the BBU and the AAU/RRU. Alternatively, the PHY-layer symbol-level processing may be partly performed in the BBU and partly performed in the AAU/RRU. In addition, after the PHY-layer bit-level processing, the signal obtained after the bit-level processing may be transmitted through the interface between the BBU and the AAU/RRU. Alternatively, after MAC processing is performed, the signal obtained after the MAC processing may be transmitted through the interface between the BBU and the AAU/RRU.

The steps S302 to S306 may be executed by the BBU, and the steps S308 to S310 may be executed by a radio frequency processing unit.

As can be learned from the above steps, the length of the optical fiber only affects the downlink frame starting time of the MAC exit. A shorter optical fiber indicates a later frame starting time, and a longer optical fiber indicates an earlier frame starting time. No compensation buffer needs to be additionally provided, and the processing time of each downlink component will not be reduced.

In an example, the above downlink data transmission method may be applied in optical fiber delay compensation of a wireless communication system. A method for optical fiber delay compensation method in the wireless communication system may include the following steps.

At Step 1, an actual delay of an optical fiber transmission is measured.

At Step 2, the actual delay of the optical fiber transmission is rounded up to obtain an optical fiber transmission delay.

At Step 3, a sum of the obtained optical fiber transmission delay and a known downlink processing delay from an MAC exit to an air interface is calculated as a downlink frame starting time of the MAC exit.

In an example, the above downlink data transmission method may also be applied in independent adjustment of a frame starting time of an MAC exit of each cell. A method for optical fiber delay compensation method in a wireless communication system may include the following steps.

At Step 1, an actual delay of an optical fiber transmission in cell 1 is measured.

At Step 2, the measured actual delay of the optical fiber transmission in cell 1 is rounded up to obtain an optical fiber transmission delay in cell 1.

At Step 3, a sum of the obtained optical fiber transmission delay in cell 1 and a known downlink processing delay from an MAC exit to an air interface in cell 1 is calculated as a downlink frame starting time of the MAC exit in cell 1.

At Step 4, an actual delay of an optical fiber transmission in cell 2 is measured.

At Step 5, the measured actual delay of the optical fiber transmission in cell 2 is rounded up to obtain an optical fiber transmission delay in cell 2.

At Step 6, a sum of the obtained optical fiber transmission delay in cell 2 and a known downlink processing delay from an MAC exit to an air interface in cell 2 is calculated as a downlink frame starting time of the MAC exit in cell 2.

It should be noted that optical fibers in different cells may have different lengths, so different cells may correspond to different optical fiber delays.

In the above embodiment, the optical fiber delay compensation is implemented by adjusting the frame starting time of the MAC exit (where a shorter optical fiber indicates a later frame starting time, and a longer optical fiber indicates an earlier frame starting time), thereby meeting the requirements of compensation for different optical fiber delays without increasing hardware costs and power consumption of the RRU, without increasing hardware costs and power consumption of the BBU, and without reducing the processing time of each baseband component, especially the PHY-layer bit-level processing time.

From the above detailed description of the embodiments, those having ordinary skills in the art can clearly understand that the methods in the above embodiments can be implemented by software and a necessary general-purpose hardware platform, and of course can also be implemented by hardware, but in many cases, the former is a more possible implementation. Based on such an understanding, the technical schemes of the present disclosure essentially or the part contributing to conventional technologies may be embodied in the form of a software product. The computer software product is stored in a storage medium (such as a ROM/RAM, a magnetic disk, an optical disc, etc.), and includes several instructions for instructing a terminal (which may be a computer, a server, a network device, or the like) to execute the methods described in the embodiments of the present disclosure.

An embodiment of the present disclosure provides a downlink data transmission apparatus. The apparatus is configured for implementing the above-mentioned embodiments and some other implementations. Details that have already been described will not be repeated here. As used herein, the term "module" may be a combination of software and/or hardware that implements a predetermined function. Although the apparatus described in the following embodiments is more possibly implemented in the form of software, an implementation using hardware or using a combination of software and hardware is also possible and can be conceived of.

Figure 4:
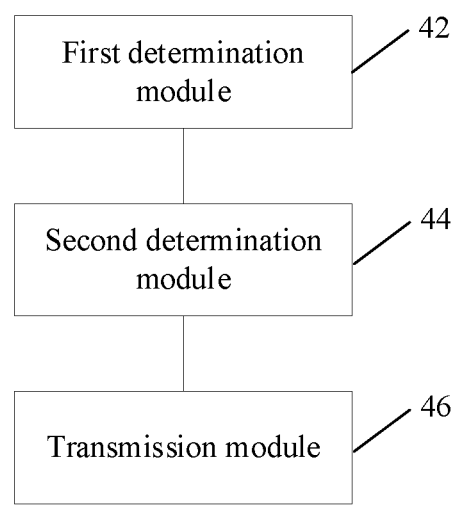
FIG. 4 is a structural block diagram of a downlink data transmission apparatus according to an embodiment of the present disclosure.

FIG. 4 is a structural block diagram of a downlink data transmission apparatus according to an embodiment of the present disclosure. As shown in FIG. 4, the apparatus includes a first determination module 42, a second determination module 44 and a transmission module 46.

The first determination module 42 is configured for determining a transmission delay, where the transmission delay includes a sum of an optical fiber transmission delay and a downlink processing delay from a MAC exit to an air interface;

The second determination module 44 is configured for determining a frame starting time of the MAC exit according to the transmission delay.

The transmission module 46 is configured for transmitting downlink data according to the frame starting time.

In an embodiment, the first determination module 42 includes one of a first determination unit, configured for determining the transmission delay configured by a predetermined device; or a second determination unit, configured for determining the optical fiber transmission delay and the downlink processing delay transmitted by a predetermined device, and determining the sum of the optical fiber transmission delay and the downlink processing delay as the transmission delay.

In an embodiment, the optical fiber transmission delay includes one of: a first optical fiber transmission delay which is a ratio of a length of an optical fiber to a data transmission speed in the optical fiber; or a second optical fiber transmission delay which is an optical fiber transmission delay determined based on a delay range within which a ratio of a length of an optical fiber to a data transmission speed in the optical fiber falls.

In an embodiment, in the case that the optical fiber transmission delay includes the second optical fiber transmission delay, the apparatus may be further configured for executing one of:

buffering the downlink data being transmitted by utilizing a first buffer disposed at an exit of a BBU, and when a buffer time reaches a first time, continuing to transmit the downlink data, where the first time is a difference between a first value and a second value, the first value is a value obtained by rounding up the ratio of the length of the optical fiber to the data transmission speed in the optical fiber, and the second value is the ratio of the length of the optical fiber to the data transmission speed in the optical fiber;

buffering the downlink data being transmitted by utilizing a second buffer disposed at an entry of an AAU/RRU, and when a buffer time reaches a second time, continuing to transmit the downlink data, where the second time is a difference between a first value and a second value, the first value is a value obtained by rounding up the ratio of the length of the optical fiber to the data transmission speed in the optical fiber, and the second value is the ratio of the length of the optical fiber to the data transmission speed in the optical fiber;

buffering the downlink data being transmitted by utilizing a first buffer disposed at an exit of a BBU, and when a buffer time reaches a first time, continuing to transmit the downlink data; and buffering the downlink data being transmitted by utilizing a second buffer disposed at an entry of an AAU/RRU, and when a buffer time reaches a second time, continuing to transmit the downlink data, where a sum of the first time and the second time is a difference between a first value and a second value, the first value is a value obtained by rounding up the ratio of the length of the optical fiber to the data transmission speed in the optical fiber, and the second value is the ratio of the length of the optical fiber to the data transmission speed in the optical fiber.

In an embodiment, an interface between the BBU and the AAU/RRU supports at least one of the following protocols: eCPRI protocol, ORAN protocol, ROE protocol, or CPRI protocol.

In an embodiment, in the case that the delay range of the ratio of the length of the optical fiber to the data transmission speed in the optical fiber is between a first delay value and a second delay value, the second optical fiber transmission delay is the second delay value, where the first delay value is smaller than the second delay value, and the first delay value and the second delay value are predetermined delay values.

It should be noted that the above modules may be implemented by software or hardware. The hardware implementation may be realized in the following manner, but the present disclosure is not limited thereto: the above modules are all located in the same processor; or, the above modules are respectively located in different processors in the form of arbitrary combinations.

An embodiment of the present disclosure provides a computer-readable storage medium, storing a computer program which, when executed by a processor, causes the processor to perform the method in any one of the above method embodiments.

In an embodiment, the computer-readable storage medium may include, but is not limited to, any medium that can store the computer program, such as a USB flash drive, a read-only memory (ROM), a random access memory (RAM), a removable hard disk, a magnetic disk, or an optical disk.

Figure 5:
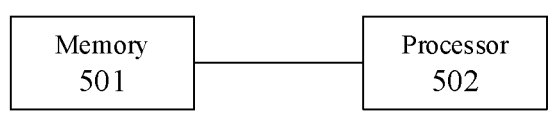
FIG. 5 is a schematic diagram of an electronic device according to an embodiment of the present disclosure.

Referring to FIG. 5, an embodiment of the present disclosure provides an electronic device, including a memory 501 and a processor 502. The memory 501 stores a computer program which, when executed by the processor 502, causes the processor 502 to perform the method in any one of the above method embodiments.

In an embodiment, the electronic device may further include a transmission device and an input/output device. The transmission device is connected to the processor. The input/output device is connected to the processor.

For various example implementations in this embodiment, reference may be made to the examples described in the above embodiments and example implementations, and the details will not be repeated herein.

According to the present disclosure, after the sum of the optical fiber transmission delay and the downlink processing delay from the MAC exit to the air interface is determined, the frame starting time of the MAC exit is determined according to the transmission delay, and the downlink data is transmitted according to the frame starting time. In this way, the optical fiber transmission delay compensation can be achieved by adjusting the frame starting time of the MAC exit. Therefore, the problems of large buffer and low downlink download throughput in some cases can be solved, thereby achieving the effect of optical fiber transmission delay compensation.

It will be apparent to those having ordinary skills in the art that, the modules or steps of the present disclosure may be realized by a general-purpose computing device; may be centrally deployed on a single computing device or distributed on a network composed of a plurality of computing devices; and may be implemented with program code executable by a computing device, and therefore may be stored in a storage device for execution by a computing device. In some cases, the steps shown or described may be performed in a different order than that described herein. Alternatively, the modules or steps may be respectively fabricated into integrated circuit modules, or a plurality of modules or steps may be fabricated into a single integrated circuit module. Therefore, the present disclosure is not limited to any particular combination of hardware and software.

The above are only some of the embodiments of the present disclosure, and are not intended to limit the present disclosure. To those having ordinary skills in the art, various modifications and variations may be made to the present disclosure. Any modifications, equivalent replacements, and improvements made within the principle of the present disclosure shall fall within the protection scope of the present disclosure.

What is claimed is:

1. A downlink data transmission method, comprising:
   determining a transmission delay, wherein the transmission delay comprises a sum of an optical fiber transmission delay and a downlink processing delay from a Media Access Control (MAC) exit to an air interface, wherein the optical fiber transmission delay comprises a second optical fiber transmission delay which is an optical fiber transmission delay determined based on a delay range within which a ratio of a length of an optical fiber to a data transmission speed in the optical fiber falls;
   determining a frame starting time of the MAC exit according to the transmission delay;
   transmitting downlink data according to the frame starting time; and
   buffering the downlink data being transmitted by utilizing a first buffer and/or a second buffer, and in response to a buffer time reaching a time, continuing to transmit the downlink data;
   wherein the first buffer is disposed at an exit of a Base Band Unit (BBU), while the second buffer is disposed at an entry of an Active Antenna Unit (AAU) or Remote Radio Unit (RRU), and the time is determined by a difference between a first value obtained by rounding up a ratio of the length of the optical fiber to the data transmission speed in the optical fiber, and a second value which is the ratio of the length of the optical fiber to the data transmission speed in the optical fiber.

2. The method of claim 1, wherein determining a transmission delay comprises one of:
   determining the transmission delay configured by a predetermined device; or
   determining the optical fiber transmission delay and the downlink processing delay transmitted by a predetermined device, and determining the sum of the optical fiber transmission delay and the downlink processing delay as the transmission delay.

3. The method of claim 1, wherein an interface between the BBU and the AAU or an interface between the BBU and the RRU supports at least one of:
   eCPRI protocol,
   ORAN protocol,
   ROE protocol, or
   CPRI protocol.

4. The method of claim 1, wherein in response to the delay range within which the ratio of the length of the optical fiber to the data transmission speed in the optical fiber falls being between a first delay value and a second delay value,
   the second optical fiber transmission delay is the second delay value, wherein the first delay value is smaller than the second delay value, and
   the first delay value and the second delay value are predetermined delay values.

5. A non-transitory computer-readable storage medium, storing a computer program which, when executed by a processor, causes the processor to perform a downlink data transmission method comprising:
   determining a transmission delay, wherein the transmission delay comprises a sum of an optical fiber transmission delay and a downlink processing delay from a Media Access Control (MAC) exit to an air interface, wherein the optical fiber transmission delay comprises a second optical fiber transmission delay which is an optical fiber transmission delay determined based on a delay range within which a ratio of a length of an optical fiber to a data transmission speed in the optical fiber falls;
   determining a frame starting time of the MAC exit according to the transmission delay;
   transmitting downlink data according to the frame starting time; and buffering the downlink data being transmitted by utilizing a first buffer and/or a second buffer, and in response to a buffer time reaching a time, continuing to transmit the downlink data;

wherein the first buffer is disposed at an exit of a Base Band Unit (BBU), while the second buffer is disposed at an entry of an Active Antenna Unit (AAU) or Remote Radio Unit (RRU), and the time is determined by a difference between a first value obtained by rounding up a ratio of the length of the optical fiber to the data transmission speed in the optical fiber, and a second value which is the ratio of the length of the optical fiber to the data transmission speed in the optical fiber.

6. The non-transitory computer-readable storage medium of claim 5, wherein determining a transmission delay comprises one of:
   determining the transmission delay configured by a predetermined device; or
   determining the optical fiber transmission delay and the downlink processing delay transmitted by a predetermined device, and determining the sum of the optical fiber transmission delay and the downlink processing delay as the transmission delay.

7. The non-transitory computer-readable storage medium of claim 5, wherein an interface between the BBU and the AAU or an interface between the BBU and the RRU supports at least one of:
   eCPRI protocol,
   ORAN protocol,
   ROE protocol, or
   CPRI protocol.

8. The non-transitory computer-readable storage medium of claim 5, wherein in response to the delay range within which the ratio of the length of the optical fiber to the data transmission speed in the optical fiber falls being between a first delay value and a second delay value,
   the second optical fiber transmission delay is the second delay value, wherein the first delay value is smaller than the second delay value, and
   the first delay value and the second delay value are predetermined delay values.

9. An electronic device, comprising:
   a processor; and
   a memory and a processor, wherein the memory is configured for storing a computer program which, when executed by the processor, causes the processor to perform a downlink data transmission method comprising:
   determining a transmission delay, wherein the transmission delay comprises a sum of an optical fiber transmission delay and a downlink processing delay from a Media Access Control (MAC) exit to an air interface, wherein the optical fiber transmission delay comprises a second optical fiber transmission delay which is an optical fiber transmission delay determined based on a delay range within which a ratio of a length of an optical fiber to a data transmission speed in the optical fiber falls;
   determining a frame starting time of the MAC exit according to the transmission delay;
   transmitting downlink data according to the frame starting time; and
   buffering the downlink data being transmitted by utilizing a first buffer and/or a second buffer, and in response to a buffer time reaching a time, continuing to transmit the downlink data;
   wherein the first buffer is disposed at an exit of a Base Band Unit (BBU), while the second buffer is disposed at an entry of an Active Antenna Unit (AAU) or Remote Radio Unit (RRU), and the time is determined by a difference between a first value obtained by rounding up a ratio of the length of the optical fiber to the data transmission speed in the optical fiber, and a second value which is the ratio of the length of the optical fiber to the data transmission speed in the optical fiber.

10. The electronic device of claim 9, wherein determining a transmission delay comprises one of:
    determining the transmission delay configured by a predetermined device; or
    determining the optical fiber transmission delay and the downlink processing delay transmitted by a predetermined device, and determining the sum of the optical fiber transmission delay and the downlink processing delay as the transmission delay.

11. The electronic device of claim 9, wherein an interface between the BBU and the AAU or an interface between the BBU and the RRU supports at least one of:
    eCPRI protocol,
    ORAN protocol,
    ROE protocol, or
    CPRI protocol.

12. The electronic device of claim 9, wherein in response to the delay range within which the ratio of the length of the optical fiber to the data transmission speed in the optical fiber falls being between a first delay value and a second delay value,
    the second optical fiber transmission delay is the second delay value, wherein the first delay value is smaller than the second delay value, and
    the first delay value and the second delay value are predetermined delay values.

* * * * *